US007921330B2

(12) United States Patent  
Riemers

(10) Patent No.: US 7,921,330 B2
(45) Date of Patent: Apr. 5, 2011

(54) DATA MIGRATION MANAGER

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 428 days.

(21) Appl. No.: 12/040,543

(22) Filed: Feb. 29, 2008

(65) Prior Publication Data

US 2009/0222691 A1    Sep. 3, 2009

(51) Int. Cl.
    *G06F 11/00* (2006.01)
(52) U.S. Cl. .......................................... 714/20; 709/202
(58) Field of Classification Search ....................... 714/20
    See application file for complete search history.

(56) References Cited

U.S. PATENT DOCUMENTS

| 7,155,462 | B1* | 12/2006 | Singh et al. .................. 717/170 |
| 7,320,005 | B2* | 1/2008 | Li et al. ............................. 1/1 |
| 7,584,131 | B1* | 9/2009 | Kurtz et al. .................. 705/36 R |
| 2004/0162844 | A1* | 8/2004 | Thome et al. ................. 707/102 |
| 2005/0262188 | A1* | 11/2005 | Mamou et al. ............... 709/203 |
| 2005/0262193 | A1* | 11/2005 | Mamou et al. ............... 709/203 |
| 2006/0059188 | A1* | 3/2006 | Shirogane et al. ............ 707/102 |
| 2008/0114830 | A1* | 5/2008 | Welingkar et al. ............ 709/203 |
| 2008/0270515 | A1* | 10/2008 | Chen et al. .................... 709/202 |
| 2009/0063504 | A1* | 3/2009 | Banister et al. ................. 707/10 |
| 2009/0063555 | A1* | 3/2009 | Fisher et al. ............... 707/103 R |
| 2009/0119476 | A1* | 5/2009 | Jernigan et al. ............... 711/204 |

* cited by examiner

*Primary Examiner* — Scott T Baderman
*Assistant Examiner* — Kamini Patel
(74) *Attorney, Agent, or Firm* — Blakely, Sokoloff, Taylor & Zafman LLP

(57) ABSTRACT

A method and apparatus for transactions during a data migration. The transfer of data from an old database to a new database is structured as a set of small transactions. The transactions can be structured in a hierarchy of dependent transactions such that the transactions are nested or similarly hierarchical. A migration manager includes a set of data conversion methods or processes that enable the conversion of data from a format of an old database to that of a new database. The conversion process generates the nested transactions to resolve dependencies between records such as primary and foreign keys. The method and system provides a higher level of granularity in transaction size, providing the ability to transfer records individually and resolve the dependencies in such transactions without requiring a large mapping of an entire data set in the old database to an organization in the new database.

14 Claims, 6 Drawing Sheets

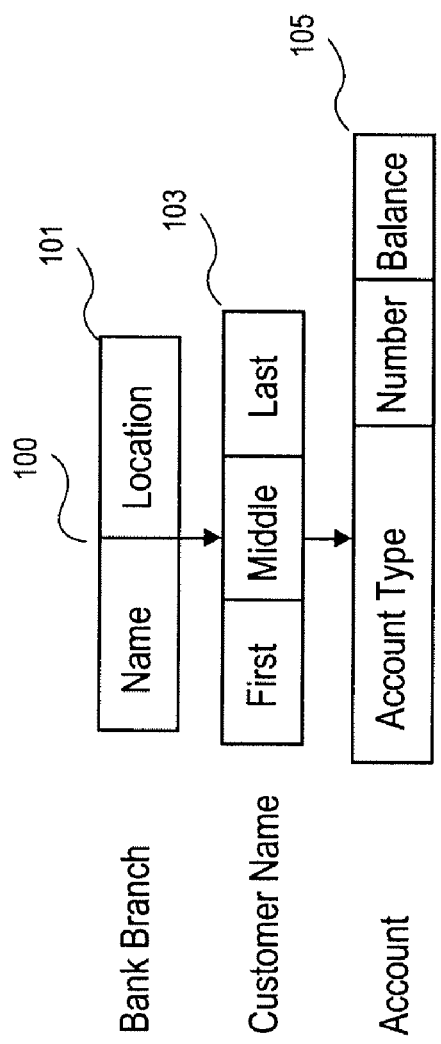
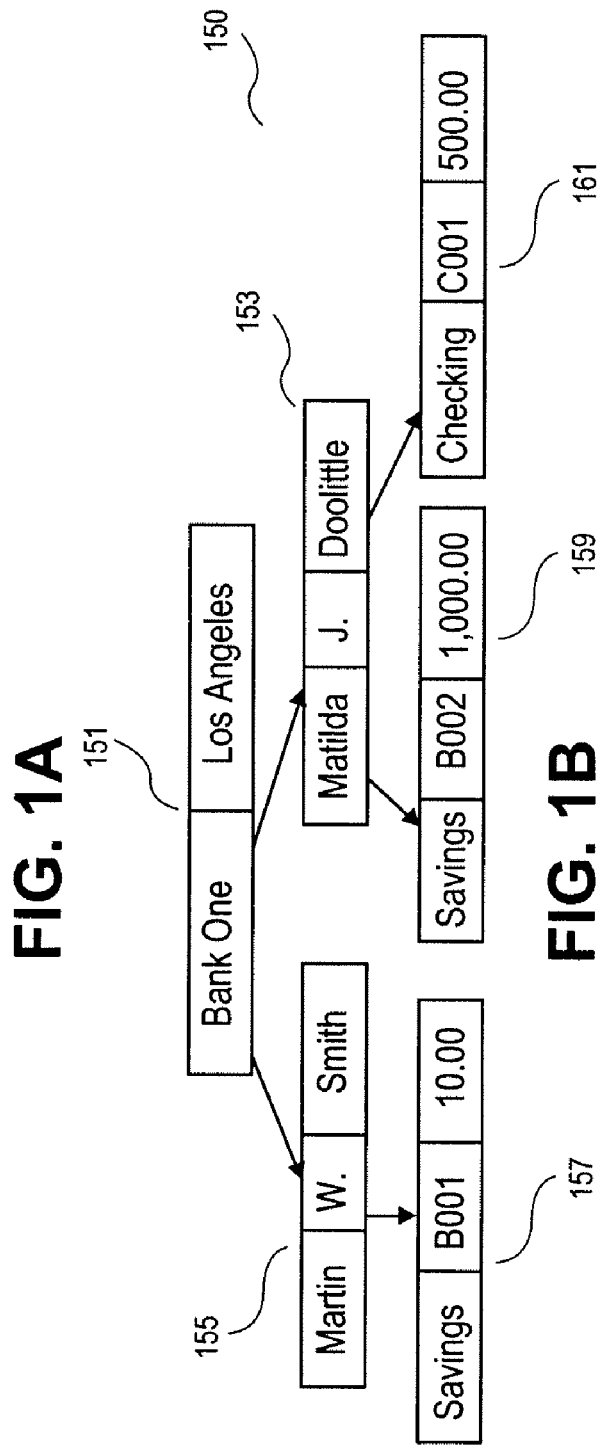
FIG. 1A
FIG. 1B

DATA MIGRATION MANAGER

CROSS-REFERENCE TO RELATED APPLICATION

Cross-reference is made to a co-pending patent application by Bill C. Reimers for "NESTED QUEUED TRANSACTION MANAGER" filed on the same date as the present application and commonly owned. The cross-referenced application is incorporated herein by reference.

TECHNICAL FIELD

Embodiments of the present invention relate to management of data migration between two databases. Specifically, the embodiments relate to a method and apparatus for managing the transfer of data using small nested transactions to convert records and insert them into the new database.

BACKGROUND

Companies often upgrade or transition between database servers and systems to improve database response times or otherwise improve their database performance. Transferring the data from the old database system to the new database system is a time intensive and labor intensive task. In other circumstances, data from multiple databases with different schemas need to be merged.

A mapping between the two databases is created to enable a reorganization of the data in the old database to fit the organization of the new database. The new database may have different methods for maintaining or selecting primary and foreign keys, organizing and storing tables and other differences from the old database. The data from each record in the old database is read from the old database and then inserted into the new database according to the mapping.

The transfer of data is performed by a program in communication with both the old database and the new database. This data transfer program starts a transaction with each database and reads each record from the old database and maps that record to the new database in a single transaction. The execution of this transaction can take a long time depending on the size of the old database. As a result, the old and new databases are inaccessible during the transaction and other programs are not able to access or utilize the old or new database. Further, the transaction cannot be easily interrupted or stopped. Such occurrences can disrupt the transfer process and corrupt it. Transactions must be completed in their entirety or rolled back. Thus, an interrupt of a large transaction forces a large rollback and then a complete restart to the transaction.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 1A is a diagram of one embodiment of a hierarchy of database record data.

FIG. 1B is a diagram of one embodiment of an example set of related records having the hierarchy of FIG. 1A.

DETAILED DESCRIPTION

Figure 2:
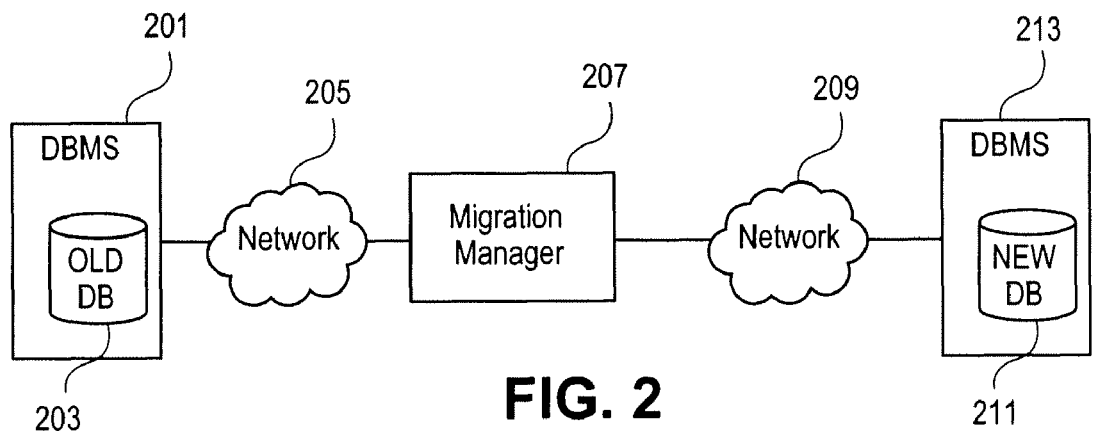
FIG. 2 is a diagram of one embodiment of a data migration system.

Described herein is a method and apparatus for transactions during a data migration. The transfer of data from an old database to a new database is structured as a set of small transactions. The transactions can be structured in a hierarchy of dependent transactions such that the transactions are nested or similarly hierarchical. A migration manager includes a set of data conversion methods or processes that enable the conversion of data from a format of an old database to that of a new database. The conversion process generates the nested transactions to resolve dependencies between records such as primary and foreign keys. The method and system provides a higher level of granularity in transaction size, providing the ability to transfer records individually and resolve the dependencies in separate transactions without requiring a large mapping of an entire data set in the old database to an organization in the new database in a single transaction.

FIG. 1A is a diagram of an example data hierarchy for a database. The hierarchy 100 of data is a simplified example. Actual data hierarchies can have any number of levels and inter-relations between the levels. Each layer in the hierarchy or each node in the hierarchical tree (in more complex hierarchies) represents a separate record or set of records. A 'set,' as used herein refers to any whole number of items including one item. Transferring any specific record with dependent or interrelated records can require that data related to the transfer of those related or dependent records be resolved before the transfer of the specific record can be completed. Each record can be transferred as a separate transaction. The resolution of dependencies may be affected by use of recursive or iterative calls to transfer the related records that creates a set of nested transactions to be resolved.

In the example hierarchy, a highest level record may be a bank branch record 101. The bank branch record includes fields such as a name and location field. The name field stores a name of a particular branch and the location field stores an address or geographical information about a branch (e.g., coordinates). Implicit or explicit fields of the record establish relationships with customer records 103. Fields that reference the customer records 103 are foreign keys, which must uniquely identify the appropriate customer records 103.

The customer record includes fields for the first, middle and last name of a customer. Again, the record includes explicit or implicit fields that reference the bank branch that the customer belongs to and must include explicit or implicit fields that reference the account records 105 that belong to the customer. The fields that reference the account records 105 are foreign keys, which must uniquely identify the appropriate account records 105 belonging to that customer.

The account records 105 include fields specifying a type of account, an account number and a balance for each account. The record may also include explicit or implicit fields that reference the customer to which the account belongs.

Each of the records in the database also includes a primary key. A primary key is a unique identifier for each record or row in a table of a database. The primary key can be a single column of a row or a set of columns in the row. For example, a specific column of each row in a table or set of related tables in a database includes a unique alpha-numeric sequence that serves as a primary key for that row. Instead of a primary key, a record can use a unique composite key. Further, in some cases a temporary key can be used to map data when a primary key or composite key is not available.

Foreign keys are references between two tables. Foreign keys can be a set of columns in a referencing table that identify a set of columns in a row of another table. The foreign key for any record typically identifies a single record (i.e., row) in another table. In the example, a column in the customer record 103 identifies a specific account record 105. The foreign key could be the account number or a separate primary key of the account record.

FIG. 1B is a diagram of one embodiment of an example set of related records having the hierarchy of FIG. 1A. The example includes a small number of records with minimal inter-relationships for sake of clarity. One skilled in the art would understand that the principles, operations, structures and features described herein would also apply to more complex sets of records. The records 150 include the records of two customers as a particular bank branch. The bank branch is identified by a bank branch record 151. The bank branch record 151 stores a name of the bank "Bank One" and a location of the bank "Los Angeles." The bank branch has two customer records that belong to "Martin W. Smith" 155 and "Matilda J. Doolittle" 153. Three account records are associated with the two customer records, identifying bank account B001 157, B002 159 and C001 161. The account B002 is associated with both the customer accounts 153, 155 and represents a shared account. In this example, the bank branch record 151 would include a foreign key identifying customer records 153, 155 and the customer records 153, 155 include foreign keys identifying account records 157, 159 and 161.

The example set of records helps to illustrate that while each record or a set of the records could be transferred to a new database, their inter-relationships may require that the transactions be structured in a nested manner. Specifically, if a new database utilized a different format for primary and foreign keys, then the foreign and primary keys for related records would need to be resolved before the other records could be finalized. A migration manager may start with a first record at the top of the hierarchy, in this example bank branch record 151. It includes a primary key and at least two foreign keys that refer to customer records 153,155. In this example, the primary key for each record is assumed to form a part of the foreign keys for other records. Thus, when processing the top bank branch record as a first transaction, two new transactions are initiated to resolve the customer records 153, 155. The customer records 153, 155 are similarly dependent on foreign keys referencing the account records 157, 159 and 161. These foreign keys, in one example, are the account numbers. However, in the new database a different account numbering system is utilized. Thus, the transfer of the account records and the update of the account numbers need to be resolved before the customer records can be finalized. Additional transactions are then initiated to transfer these records, which have no further dependencies.

Once the, transactions for the account records are completed, the account records will have updated account numbers and the foreign keys and new primary keys for the customer records can be determined. Once the customer records are converted then the bank branch records can be converted and committed using the new primary keys of the customer records as part of the foreign keys in the bank records. Thus, the recursive or iterative process works its way down a hierarchy of nesting transactions to lower level records dependent from the higher level records and then works its way back up the hierarchy as the lower levels are resolved.

The data conversion, transaction management and migration methods and processes along with a set of data management structures are utilized to track the state and order of the operations necessary to complete the migration of data including the mapping of the data into the new database. In some embodiments, to minimize the extent of nesting, default values or similar place holder values may be utilized in the mapping of data and the insert operations into the new database. These values are then corrected at a subsequent time after all of the relevant data has been mapped to the format of the new database.

While the examples provided herein relate to the migration of data from an old database to a new database having a different schema, one skilled in the art would understand that the principles, processes and component utilized for that type of migration can also be applied to similar types of data migration. Other types of data migration include migration of data within a database from one schema to another schema or from one account to another account. The migration process can also be utilized for cloning records. In one example, the migration could be utilized copying records for customers between subdivisions of a company or organization. The process could also be used by creating template records and using them to set up new accounts more quickly. For sake of clarity, the examples and discussion herein is related to the migration of records from an old database to a new database.

FIG. 2 is a diagram of one embodiment of a data migration system. The system 200 includes an old database 203, a migration manager 207 and a new database 211. These components can communicate with one another over a network 205 or set of networks 205, 209. The networks 205, 209 can by any type of networks including local area networks (LANs), wide area networks (WANs), such as the Internet or similar networks. In another embodiment, the components can be connected by direct links such as Universal Serial Bus (USB), IEEE 1394 links and similar communication mediums. The networks can be wireline or wireless networks or combinations thereof.

In one embodiment, the old database 203 is provided by a server or set of server machines executing a database management system 201. Any type of database can be serviced including relational databases, object-oriented databases and similar databases. The old database 203 can be of any size and hold any amount of data.

The new database 211 is provided by a server or set of server machines executing another database management system 213. Any type of database can be serviced including relational databases, object-oriented databases and similar databases. The new database 211 can be of any size and hold any amount of data. Often the new database 211 will have a larger size, a different type of organization, improved performance characteristics or similar properties that motivate the transition of data from the old database 203 to the new database 211. The old database 203 and new database 211 can be provided by the same vendor or different vendors. The old database 203 and new database 211 can also be executed on the same set of server machines or a separate set of server machines.

The migration manager 207 is an application that is executed by a computer in communication with the old database 203 and the new database 211. In one embodiment, the migration manager 207 can be executed on the server or set of servers that provide either the old database 203 or the new database 211. In another embodiment, the migration manager 207 is executed on a separate computer. The migration manager 207 retrieves data from the old database 203 and inserts the retrieved data into the new database 211. The migration manager 207 remaps the data from a format or model utilized by the old database 203 into a format or model utilized by the new database 211.

Figure 3:
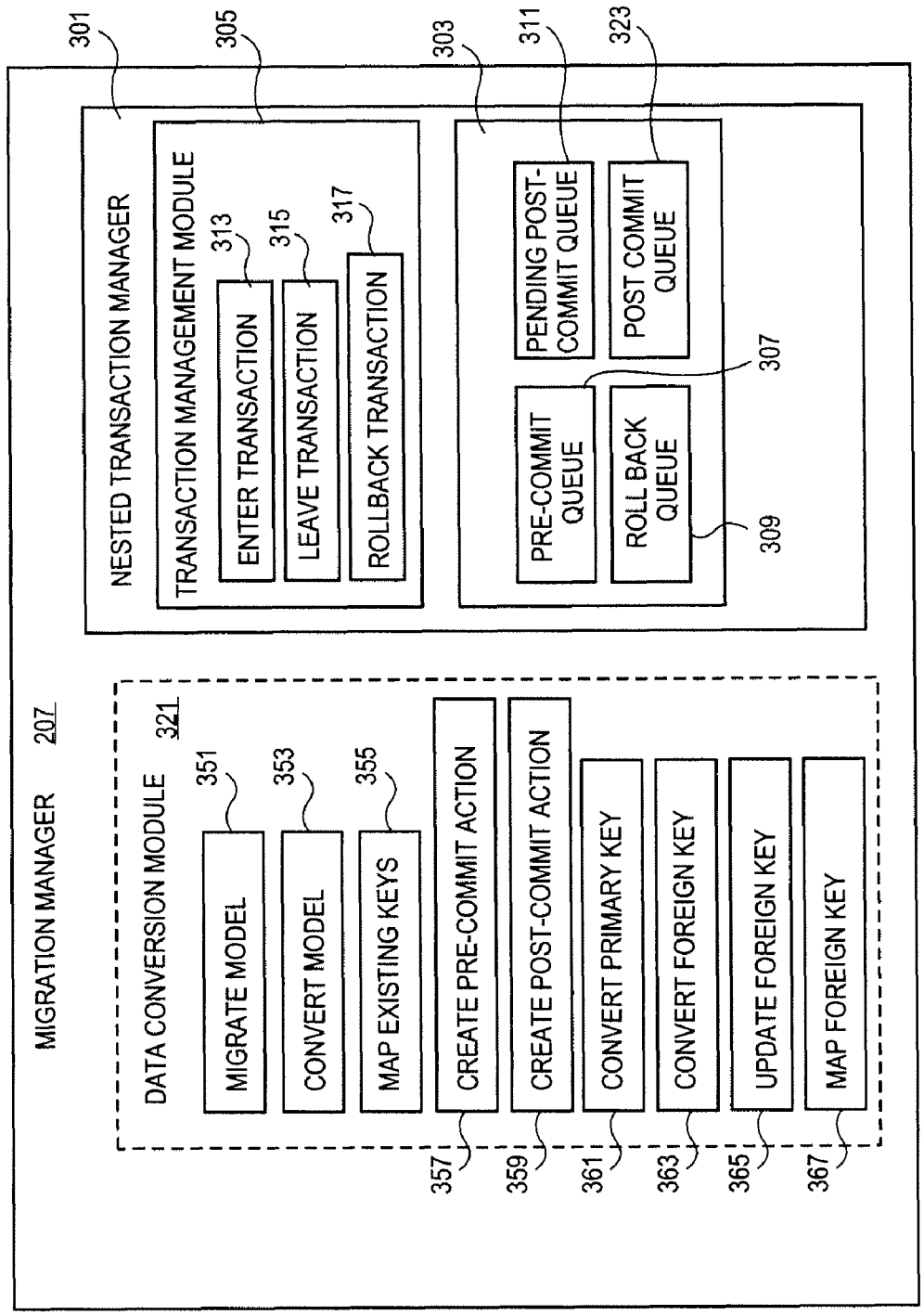
FIG. 3 is a diagram of one embodiment of a data migration manager.

FIG. 3 is a diagram of one embodiment of a migration manager. The migration manager includes a nested transaction manager 301 and a data conversion module 321. The migration manager 207 drives the retrieval of data from an old database, the conversion of the data to fit a new database and the insertion of that data into the new database.

The migration manager 207 utilizes a data conversion module 321 to transform or map the data from the old format or model to the new format or model. The migration manager 207 utilizes a nested transaction manager 301 to manage the transactions that are generated for each set of records. One skilled in the art would understand that the migration manager 207 could include other components or organize these components in other configurations. For example, the data conversion module 321 may not be a discrete component, but rather a logical grouping of components that perform a set of related operations. The embodiment described herein is provided by way of example for sake of clarity and the principles, features, structures and operations described in relation to this example embodiment can be applied to other configurations and embodiments.

The nested transaction manager 301 includes a data management component 303 and a transaction management component 305. The data management component 303 encompasses the data structures and storage components that are utilized by the migration manager 207 and the data conversion module 321 to track the state and organize the migration of data from the old database to the new database in a set of nested transactions. The transaction management component 305 encompasses a set of methods or programs that manage the transactions and the data in the data management component 303 to enable the nested transactions in coordination with the set of methods and programs in the data conversion module 321.

The data management component 303 includes a set of queues including a pre-commit queue 307, a rollback queue 309, a pending-post-commit queue 311 a post-commit queue 323 and/or similar data structures and storage devices. The nested transaction manager 301 and data conversion module can be configured to utilize or require any sub-set of these queues. Similarly, the nested transaction manager 301 and data conversion module 321 can be configured to omit any set of these queues.

The pre-commit queue 307 is a data structure or storage device that orders and stores a set of actions associated with a transaction that has not yet been committed. The pre-commit queue 307 may be a first-in first-out (FIFO) queue, a stack or last-in first-out (LIFO) queue or similar data and storage structure. The pre-commit queue 307 tracks actions that are associated with transactions that have not been committed, because they are dependent on or rely on other transactions that have not been committed or similar actions.

The post commit queue 323 is a data structure or storage device that stores the actions associated with transactions that have been committed. The post-commit queue 323 may be a FIFO, LIFO or similar data or storage structure. The post-commit queue 323 actions have been executed, The post-commit queue 323 can be utilized to track completed actions, for logging, debugging or rollback methods or for similar functions.

The pending-post-commit queue 311 is a data structure or storage device that stores the actions associated with transaction that have been committed, but the associated actions have not yet been executed. As the actions are executed they are moved to the post-commit queue. The pending-post-commit queue 311 may be a FIFO, LIFO or similar data or storage structure.

A rollback queue 309 is a data structure or storage device that tracks or stores a set of actions that may need to be undone in the case of a failure, interruptions or similar case where a rollback operation if performed. The data tracked in the rollback queue 309 allows the migration manager 207 to perform a rollback operation to return the old database and/or the new database to a previous condition or state. The rollback queue 309 may be structured as a FIFO, LIFO or similar data structure or storage structure.

This set of queues enables the nested transaction manager 301 to transfer the data of the old database to a new database in a set of small discrete inter-related transactions. The queues also enable rollback of transactions involving failed data transfers or similar errors. The queues can be of any size or organization dependent on the characteristics of the database to be transferred and the type of data to be transferred.

The transaction management component 305 includes a set of methods or similar programs including an "Enter Transaction" method 313, a "Leave Transaction" method 315 and a "Rollback Transaction Method" 317. These methods can be implemented as discrete computer software or hardware components. For example, the methods may form an application programming interface (API) or similar structures. These methods are called by other components such as the migrate model 351 component to handle the start, end and failure of individual transactions.

The enter transaction method 313 is called by the migrate model 351 component to initiate a new transaction. The enter transaction method 313 can initiate a new transaction or a nested transaction. The leave transaction method 315 is called by the migrate model 351 component to end or exit a transaction including a nested transaction. The leave transaction method 315 alters the data management component 303 queues. The rollback transaction method 317 is called by the migrate model 351 or is called in response to an error or similar event such as a failed insert into the new database. The rollback transaction method 317 returns the old and new databases to previous states that reverse the effects of the failed operation. In one embodiment, the rollback transaction method 317 reverses the current transaction and any nested transactions through reversing the operations of these transactions or canceling the transactions.

In one embodiment, the data conversion module 321 includes a set of components including a migrate model 351 component, convert model 353 component, a map existing keys 355 component, a create pre-commit action 357 component, a create post-commit action 359 component, a convert primary key 361 component, a convert foreign key 363 component, a update foreign key 365 component and a map foreign key 367 component.

The migrate model 351 component receives a record indicator or a record as a parameter and manages the transfer of this record from an old database to a new database. The migrate model 351 component initiates a transaction for the received record and determines what level of transaction has been initiated. If the transaction is a top level transaction then constant records are migrated along with the received record. The data in the record is converted by a call to the convert model 353 component. When the conversion has been completed then the converted record is inserted into the new database. Upon successful completion of the insertion, the transaction is ended. In one embodiment, the migrate model 351 component is implemented as an overloaded method, such that different types of records are handled differently. In another embodiment, separate instances, implementations or components handle each different record type. The migrate model 351 component functionality is described in further detail below in relation to FIG. 4.

The convert model 353 component copies data from the record into a new record having the format of the new database. Data can also be derived, split, merged or similarly modified or created using any algorithm or formula to convert the data in the record to the new format of the new record for the new database. Primary and foreign keys are either provided or obtained through calls to the convert primary key 361 component and the convert foreign key 363 component. In one embodiment, the convert model 353 component is implemented as an overloaded method, such that different types of records are converted differently. In another embodiment, separate instances, implementations or components handle each different record type. The convert model 353 component is described in further detail below in relation to FIG. 5.

The map existing keys 355 component updates a migration data structure that tracks the records of the old database that have already been migrated. The map existing keys 355 component is called by the migrate model 351 component in response to a determination that a received record has already been migrated. The foreign keys of the migrated record are then added to the migration tracking data structure, because the dependent records must already have been migrated as well. The addition of the current record to the tracking data structure can be done by the migrate model 351 component, the map existing keys 355 component or a similar component.

The create pre-commit action 357 component is a method or program that generates code that will be called prior to committing an action. The code is added to the pre-commit queue. Pre-commit actions can be used to update default or placeholder foreign key values with mapped values. At the time that the pre-commit action is called, the new record will have already been inserted into the database, so the entry in the foreign table is able to reference the migrated record. In one embodiment, the create pre-commit action 357 can be implemented as an overloaded method such that different types of records, actions or other migration operations can be handled differently. In another embodiment, separate instances, implementations or components handle each different record type.

The create post-commit action 359 component is a method, program or component that generates code that will be called after a successful commit of a transaction. The code migrates and updates any dependent records. For example, after successfully migrating a record, the old database is queried and any record that has a foreign key referencing the migrated record can be migrated as well. The create post-commit action 359 component is implemented as an overloaded method such that different types of records, actions or other migration operations can be handled differently. In another embodiment, separate instances, implementations or components handle each different record type.

The convert primary key 361 component is a method, program or component that converts the old primary key of a record to a new primary key according to the format of the record for the new database. Any algorithm, formula or system can be applied to determine the new primary key. In the case of a compound primary key, the determination of the new primary key may require the conversion of other database records by calling the migrate model 351 component for each of the other records. The convert primary key 361 component can be implemented as an overloaded method such that different types of records and primary keys can be handled differently. In another embodiment, separate instances, implementations or components handle each different record type.

The convert foreign key 363 component is a method, program or component that converts the old foreign keys of a record into new foreign keys according to the format of the record for the new database. Any algorithm, formula or system can be applied to determine the new primary key. The records referenced by the foreign keys can be converted with a map foreign key 367 call. The foreign keys can also be determined by a pre-defined or user specified mapping, use of a default value or any algorithm, formula or system for calculating the foreign keys. In some embodiments or cases, to avoid excessive nesting in the transactions, foreign keys are mapped with a default value and then remapped using the update foreign keys 365 component. The convert foreign key 363 component can be implemented as an overloaded method such that different types of records and primary keys can be handled differently. In another embodiment, separate instances, implementations or components handle each different record type.

The update foreign keys 365 component is a method, program or component that is utilized to correct a record that has already been inserted into the new database. The update foreign keys 365 component updates the inserted record by mapping keys in the record using map foreign key 367. These keys were not mapped previously with the convert foreign key 363 component or a default or dummy value was utilized by the convert foreign key 363 component to prevent excessive nesting of transactions. The update foreign keys 365 component can be implemented as an overloaded method such that different types of records and keys can be handled differently. In another embodiment, separate instances, implementations or components handle each different record type.

The map foreign key 367 component is a method, program or component that is responsible for initiating the conversion of records referenced by a foreign key. The map foreign key 367 component can call the migrate model 321 component for a referenced record to obtain a primary key for that record or retrieve data from a specific field of that record. The data required is dependent on the type of record being converted. The acquired data is then utilized in an algorithm, formula, system or simple mapping to generate a new foreign key for the converted and migrated referenced record to be used in the referencing record. The map foreign key 367 component can be implemented as an overloaded method such that different types of records and keys can be handled differently. In another embodiment, separate instances, implementations or components handle each different record type.

Figure 4:
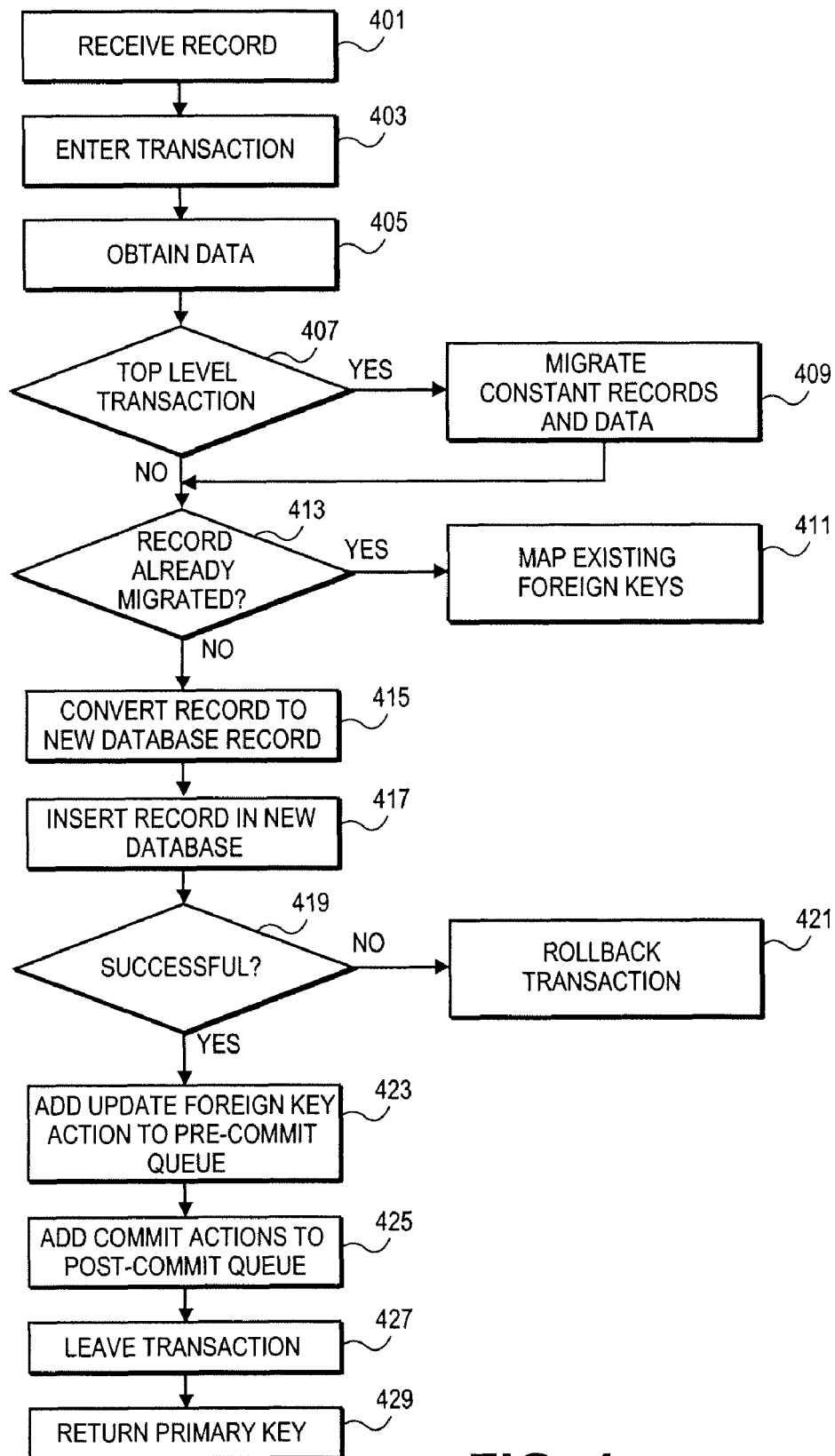
FIG. 4 is a flowchart of one embodiment of a process of record migration.

FIG. 4 is a flowchart of one embodiment of a process of a record migration. The record migration process is executed by a migrate model component or similar component of the migration manager. The process is initiated by a user or application calling the migrate model component and providing a record or record indicator to the migrate model component (block 401). The record can be selected by a user through an application or an application may systematically select records to be transferred. The record is stored in an old database and is to be migrated to a new database. For example, a user could designate the bank branch record of "Bank One" in "Los Angeles" in FIG. 1

A new transaction is opened to transfer the record (block 403). The opening of the transaction may start a communication link between the old database and the migration manager and between the migration manager and the new database, depending on the level of the transaction. If the transaction is a top level transaction, that is a transaction directly initiated by a user or application, then the communication link and similar aspects of the transaction are initiated. If the transaction is a nested transaction that is called by data conversion module component or similar component, then the communication link and similar aspects of the transaction have already been initiated.

If an incomplete record is received as a parameter or if only a record indicator is received as a parameter, then the remainder or the entire record is retrieved from the old database (block 405). In another embodiment, even when the whole record is received as a parameter, the record is also retrieved from the old database to verify the contents of the record. The record retrieval can be implemented as a query or similar operation on the old database. For example, a record indicator could be a primary key of the bank branch record. The remainder of the record, including the "Bank One" name and "Los Angeles" location would then be retrieved.

A check is then made to determine if the transaction is a top level transaction (block 407). For example, a transaction for the bank branch record is a top level transaction. If the transaction is a top level transaction, then the constant records associated with the old database or the received record (block 409). A constant record is a record or other data structure that does not have significant interdependencies with other records and can be easily transferred to the new database.

A check is also made to determine whether the input record is already present in the new database (block 413). If the record has already been transferred, then the data structure tracking the migration of records is updated. The update of the records can include updating the data structure with the current record. The records referenced by the current record through foreign keys can also be mapped into the data structure (block 411). A map existing keys component may perform this mapping. Any type of data structure including a hash table, tree or similar data structure can be used to track the migration of records. For example, if the bank branch record has already been migrated then each of the customer records may already have been migrated. The migration of the records referenced by the foreign keys may be verified by queries to the new database. If the record has already been migrated the migration process may complete. In one embodiment, the leave transaction component is called.

If the record has not already been migrated to the new database, then the record is converted by a call to the convert model component (block 415). The convert model component returns a record in the format of the new database. This new database formatted record is then inserted into the new database (block 417). The insertion into the new database can be performed using any type of database insertion operation. If the insertion is not successful (block 419), then the transaction is not committed and is rolled back. The rollback transaction component is called to implement the rollback operation (block 421).

If the insert operation is successful (block 419), then the migrate model process may add a call to the update foreign key component to the pre-commit queue (block 423). This action updates unresolved foreign keys in the record or related records after they have been committed at the time that the leave transaction is called for the transaction.

Actions that have been committed are then added to the post-commit queue (block 425). The leave transaction component is then called (block 427). The leave transaction component updates the data management queues that track the actions and state of the migration. The migrate model component then returns the primary key to the calling component or application. The primary key may be needed by a calling component to complete the migration of related records.

Figure 5:
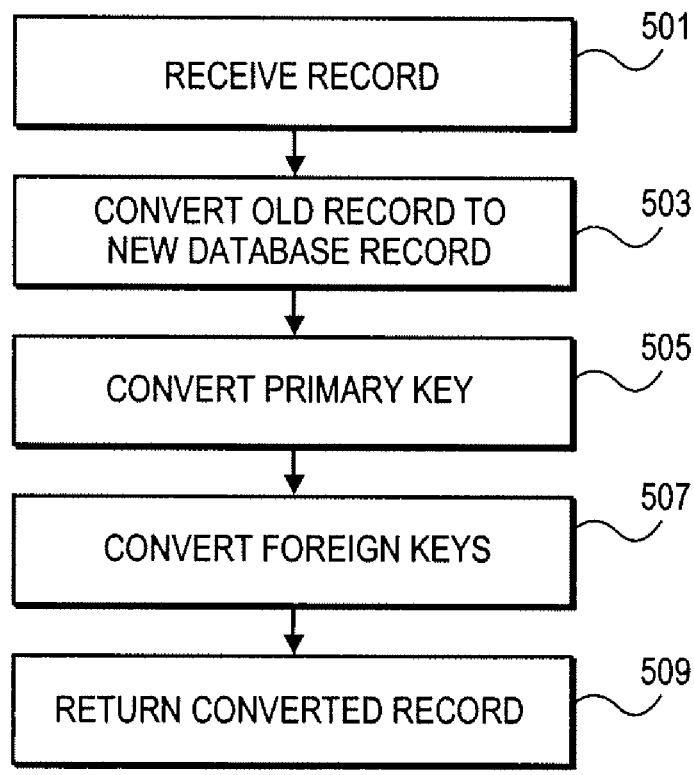
FIG. 5 is a flowchart of one embodiment of a process for record conversion.

FIG. 5 is a flowchart of one embodiment of a process for record conversion. This process can be executed by the convert model component. The process is initiated by a call to the convert model component. The call includes an indicator of a record, a portion of a record or a complete record as a parameter (block 501). Any portion of the record that was not received as a parameter can be retrieved from the old database. The portions of the record received can also be checked against the old database.

The record is then converted to the format of the new database (block 503). The conversion can be determined by the type of the record. For example, the convert model component can be an overloaded method with separate implementations for each record type. The mapping of fields in the old database record to the new database record is then implemented in the convert model implementations by the programmer. Using the example records of FIG. 1B, the separate overloaded implementation of the convert model component is defined for each of the bank branch record type, customer record type and account record type. Each individual record is converted by a separate instance of the convert model component. The mapping of records can also be placed in external files or data structures and applied by the convert model component. The mappings are utilized for relatively simple movement or reorganization of data from the format of the old database to the format of the new database.

In some cases, the primary key of the old database record is different from format of the primary key of the new database. The convert primary key component is then called to resolve the conversion or generation of the primary key for the new record (block 505). If the primary key for the new database is automatically generated on insertion, then the convert primary key can simply use a placeholder or dummy value. A placeholder or dummy value can be a null or nil value. Similarly, in some cases, the foreign keys of the record cannot be simply mapped and are converted using the convert foreign key component (block 507). The convert foreign key component may initiate the conversion of other records to complete the update of the foreign keys for the current record or may insert a default or dummy value to be replaced or updated at a later time. For example, in reference to FIG. 1B, the customer records include foreign keys for each of the associated account records. Default values such as the old values, encoded values or any type of values can be used in place of the updated foreign keys. In the alternative, the convert foreign keys component initiates the migration of the account records to allow the customer records to be resolved before being committed. Returning to the discussion of FIG. 5, after the primary and foreign keys have been converted, then the converted record is returned to the calling migrate model component.

Figure 6:
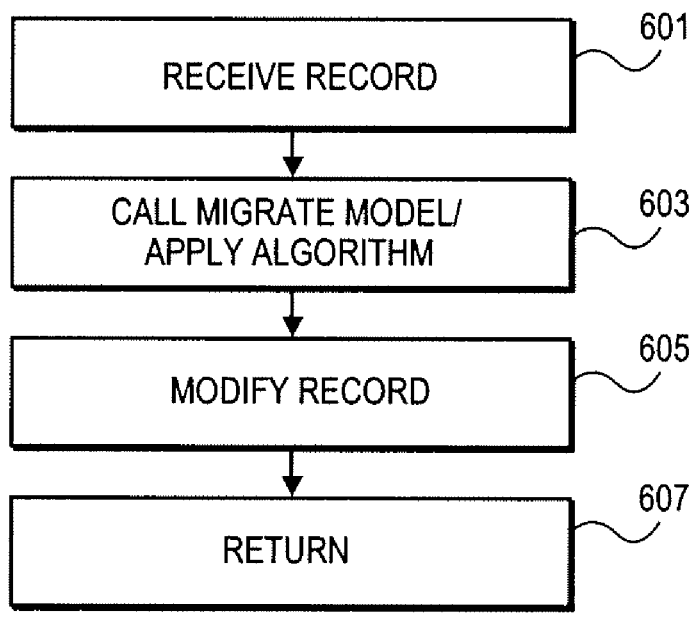
FIG. 6 is a flowchart of one embodiment of process for key conversion.

FIG. 6 is a flowchart of one embodiment of process for key conversion. This key conversion is an abstracted representation of both the primary and foreign key conversion. The process of key conversion is initiated by a call to the convert primary key or convert foreign key components (block 601). In some cases, especially with primary keys, the new keys can be generated by application of an algorithm, formula or system to data (e.g., such as the old keys) in the current or (e.g., the referenced columns) in the related records (block 603). The appropriate algorithm, formula or system is determined based on the type of record. In some cases, especially with foreign keys and compound primary keys, the requisite data includes data in other records that have not yet been migrated.

The migrate model component is then called to initiate the conversion of these related records thereby by creating a nested transaction (block 603). For example, with the records of FIG. 1B, convert foreign key component implementation specific to the account record type convert the foreign keys linking the customer record to the account records. The foreign key in this example can be the account number, which in the new database could be entirely numeric. Thus, the old alphanumeric account numbers could be converted by a formula, which may be resolved by migrating the account records. Returning to FIG. 6, limits may be placed on the number of levels of nested transactions or similar nesting limitations may be imposed for any record or implementation of the key creation components. In these cases, a default or dummy value is utilized to be corrected at a later time after the required records have been converted or migrated.

After the necessary key information has been generated or retrieved, then the record is modified to include this information (block 605). In some cases, a record may have multiple foreign keys and the process may be executed separately to resolve each of the keys in the record. The key conversion process then returns to the calling process.

Figure 7:
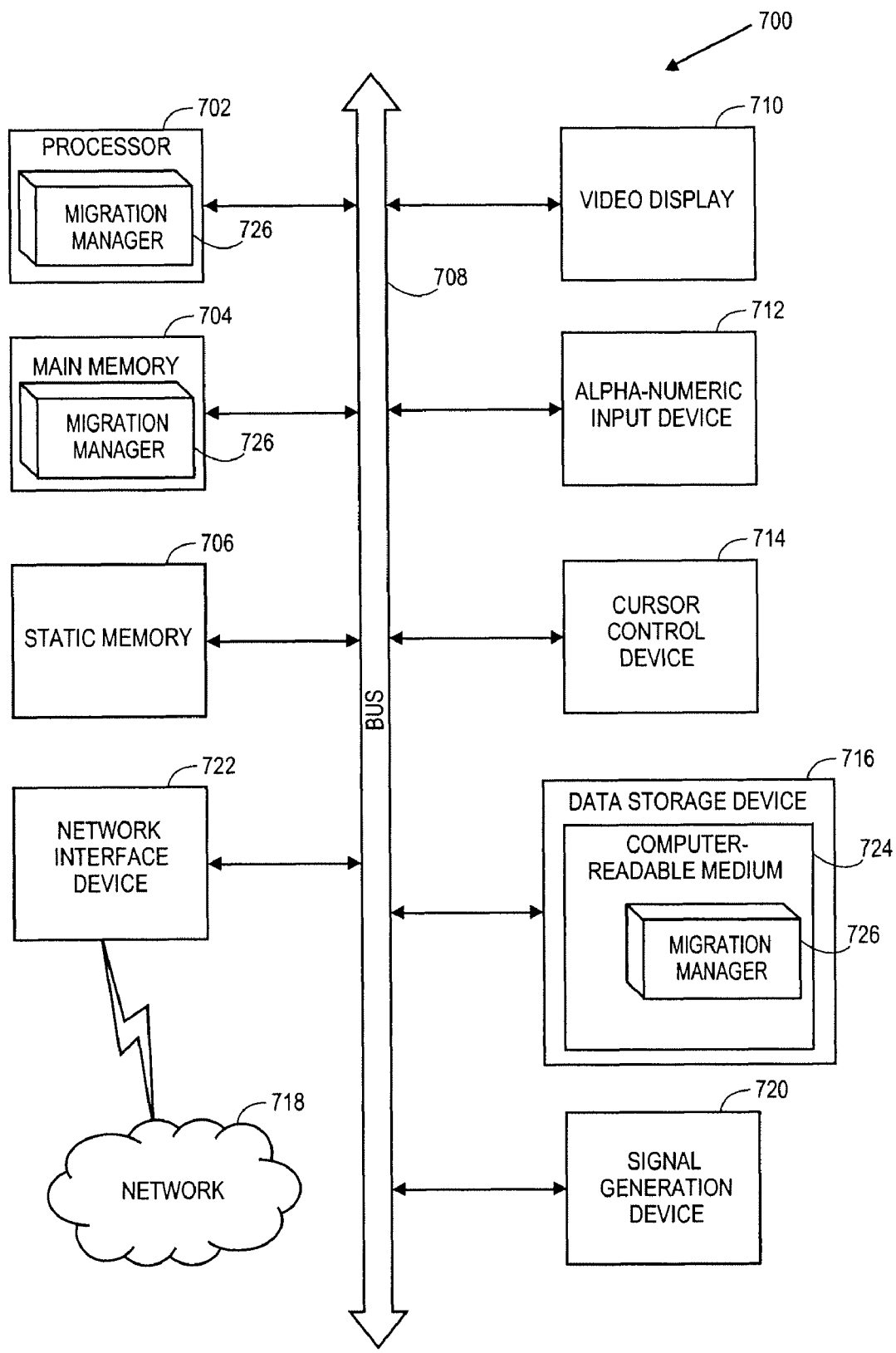
FIG. 7 is a diagram of one embodiment of a computer system providing a migration manager.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine (e.g., the computer executing the migration manager) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable medium), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the migration manager logic 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., migration manager logic 726) embodying any one or more of the methodologies or functions described herein. The logic 726 may also reside, completely or at least partially, within the main memory 704 and/or within the processing device 702 during execution thereof by the computer system 800, the main memory 704 and the processing device 702 also constituting machine-readable storage media. The logic 726 may further be transmitted or received over a network 718 via the network interface device 722.

The machine-readable storage medium 724 may also be used to store the migration manager logic 726 persistently. While the machine-readable storage medium 724 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It would be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise in the above discussion, it is appreciated that throughout the description, discussions utilizing terms such as "processing," "computing," "generating," "determining," "selecting," "displaying," "searching," "receiving," "updating," "modifying," "assigning," "requesting," "forwarding," "adding," "rewriting," "starting," "converting," "mapping," "migrating," "inserting," "initiating" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein above are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for managing data migration between databases using small transactions has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    receiving a record indicator for a first record from a first database to be migrated to a second database;
    starting a first transaction to migrate the first record to the second database;
    converting the first record to a format compatible with the second database;
    generating a second transaction during the first transaction to migrate a second record related to the first record;
    receiving a request to open the first transaction; and
    converting a primary key to the format of the second database.

2. The computer-implemented method of claim 1, further comprising:
    determining a level of the first transaction; and
    migrating constant records in response to determining the first transaction is a top level transaction.

3. The computer-implemented method of claim 1, further comprising:
    determining whether the first record is present in the second database; and
    mapping records associated with foreign keys of the first record, in response to determining the first record is present in the second database.

4. The computer-implemented method of claim 1, further comprising:
    inserting the first record into the second database.

5. The computer-implemented method of claim 1, further comprising:
    initiating a rollback of the first transaction in response to an error during the first transaction.

6. The computer-implemented method of claim 1, further comprising:
    adding an action to update foreign keys in the first record to a pre-commit queue.

7. The computer-implemented method of claim 1, further comprising:
    returning the primary key for the first record upon completion of the first transaction.

8. A computer readable storage medium, having instructions stored therein, which when executed, cause a computer to perform a set of operations comprising:
    receiving a record indicator for a first record from a first database to be migrated to a second database;
    starting a first transaction to migrate the first record to the second database;
    converting the first record to a format compatible with the second database;
    generating a second transaction during the first transaction to migrate a second record related to the first record;
    receiving a request to open the first transaction; and
    converting a primary key to the format of the second database.

9. The computer readable storage medium of claim 8, having further instructions therein, which when executed, cause the computer to perform a further set of operations, further comprising:
    determining a level of the first transaction; and
    migrating constant records in response to determining the first transaction is a top level transaction.

10. The computer readable storage medium of claim 8, having further instructions therein, which when executed, cause the computer to perform a further set of operations, further comprising:
    determining whether the first record is present in the second database; and
    mapping records associated with foreign keys of the first record, in response to determining the first record is present in the second database.

11. The computer readable storage medium of claim 8, having further instructions therein, which when executed, cause the computer to perform a further set of operations, further comprising:
    inserting the first record into the second database.

12. The computer readable storage medium of claim 8, having further instructions therein, which when executed, cause the computer to perform a further set of operations, further comprising:

initiating a rollback of the first transaction in response to an error during the first transaction.

13. The computer readable storage medium of claim 8, having further instructions therein, which when executed, cause the computer to perform a further set of operations, further comprising:
adding an action to update foreign keys in the first record to a pre-commit queue.

14. The computer readable storage medium of claim 8, having further instructions therein, which when executed, cause the computer to perform a further set of operations, further comprising:
returning the primary key for the first record upon completion of the first transaction.

* * * * *